J. M. WILSON.
SHIELD ATTACHMENT FOR SULKY RAKES.
APPLICATION FILED NOV. 28, 1911.
1,022,216.
Patented Apr. 2, 1912.
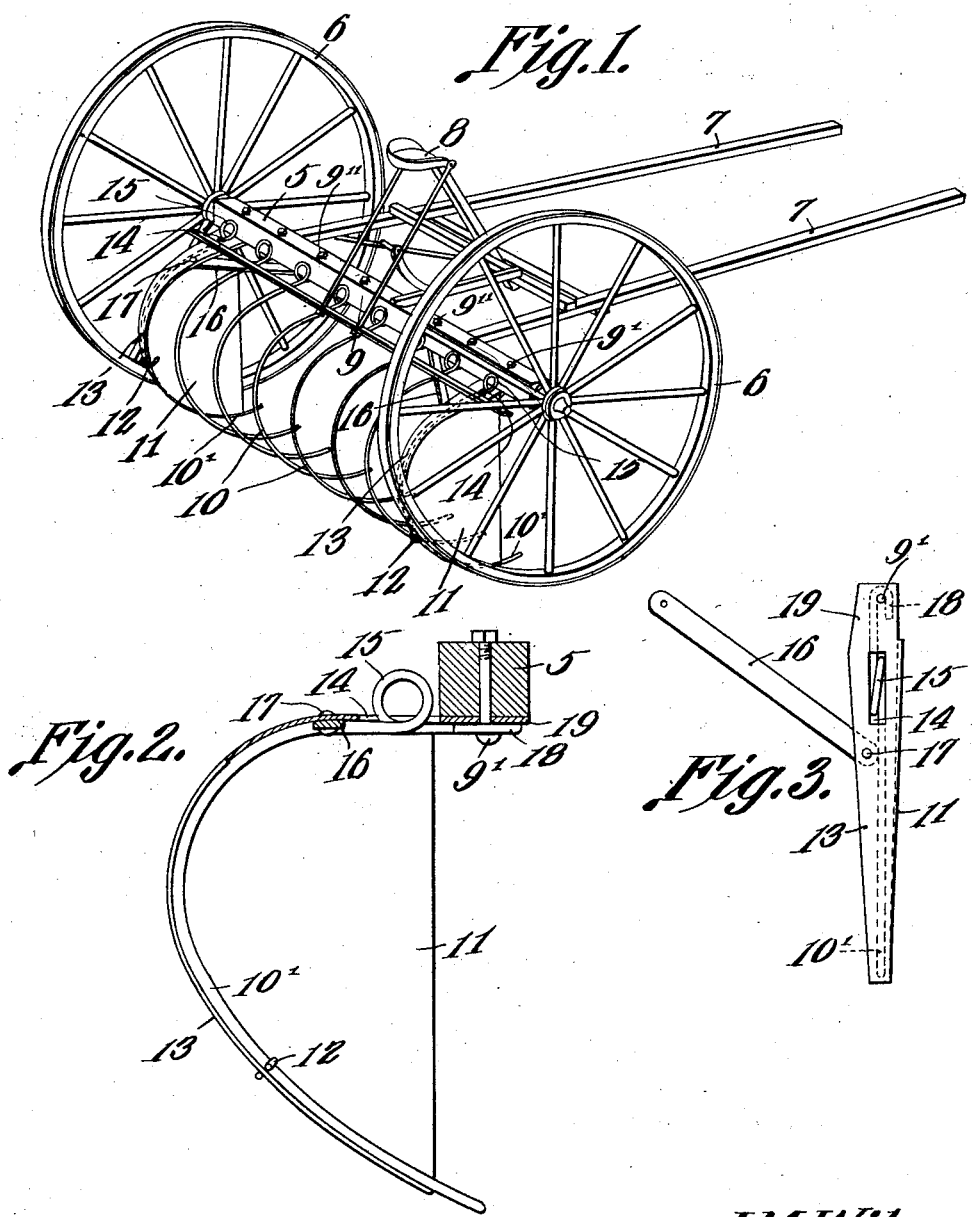
J. M. Wilson,
Inventor
Witnesses
by C. A. Snow & Co.
Attorneys

UNITED STATES PATENT OFFICE.

JAMES M. WILSON, OF ATLANTA, KANSAS.

SHIELD ATTACHMENT FOR SULKY-RAKES.

1,022,216.  Specification of Letters Patent.  Patented Apr. 2, 1912.

Application filed November 28, 1911. Serial No. 662,878.

*To all whom it may concern:*

Be it known that I, JAMES M. WILSON, a citizen of the United States, residing at Atlanta, in the county of Cowley and State of Kansas, have invented a new and useful Shield Attachment for Sulky-Rakes, of which the following is a specification.

This invention relates to shield attachments for sulky rakes.

In the use of sulky rakes, the hay or other material to be gathered thereby in accumulating causes some of the hay to escape or pass out of the end teeth and thereby cause a waste of hay, or requiring the same to be again raked up which involves time and labor, and the hay in passing out of the end teeth also frequently catches in the wheels of the sulky rake to cause annoyance. It is also occasionally the case that the freedom of the end teeth causes same to get entangled in the wheels thus distorting or breaking the teeth. Inasmuch as the end teeth are arranged adjacent the wheels, there is no necessity for the great freedom of movement thereof, as the wheels in passing over obstructions, such as rocks and the like, will naturally raise the end teeth to escape such obstructions.

It has therefore been the object of the present invention to overcome the above and other objections by the provision of a novel shield attachment for the end teeth of the rake to swing with the rake teeth and which will not only prevent the hay from escaping but will also modify the action of the end teeth sufficiently to prevent the entanglement of the teeth with the wheels.

It is also the object of the present invention to provide a simple, inexpensive, and efficient device of this character.

To the above ends the present invention is embodied in the novel construction and combination of parts elicited in the following description and pointed out in the appended claims, reference being had to the accompanying drawings, wherein similar reference characters indicate similar parts, and wherein:—

Figure 1 is a perspective view of a sulky rake embodying the present invention. Fig. 2 is a sectional view in detail taken through the axle of the sulky rake. Fig. 3 is a top view of the attachment applied to one of the end teeth.

Referring in detail to the drawings, the sulky rake is of the usual construction embodying the axle 5, wheels 6 mounted on the ends of the axle, the rake teeth 10 bolted to the underside of the axle, the thills or shafts 7, and the seat 8 for the operator. The end teeth are designated as 10′ having the upper loops 15 and having the upper extremities formed into hooks 18. The teeth 10 are secured to the axle 5 by the bolts 9, the end bolts being designated as 9′. The bolts 9′ pass through the hooks 18 of the end teeth 10′ to clamp the upper ends of the end teeth to the bottom of the axle 5.

The shield attachment comprises a plate 11 having one edge curved to correspond to the curve of the rake teeth and having a flange projecting from the said curved edge to receive one of the end teeth, the flange being designated by the numeral 13 and the said flange having a slot 14 in the upper end thereof for the passage of the loop of the tooth and having an ear 19 projecting from the corresponding end of the flange to be clamped between the axle and the hooked end 18 of the tooth.

In the application of the shield attachments to the rake, a right hand and a left hand are applied to the respective end teeth 10′, the loops 15 of the said teeth being passed through the slots 14 and the ears 19 being clamped between the hooked ends 18 of the end teeth and the axle 5. The end teeth 10′ are also secured at an intermediate portion to the flanges 13 by securing members 12. The flanges 13 are tapered from their upper ends to their lower ends to merge into the plates 11 at the lower ends, and braces 16 are secured to the flanges 13 by means of rivets 17 and to the intermediate bolts 9″. The braces 16 limit the lateral swing of the end teeth 10′ to prevent the end teeth from becoming entangled with the wheels 6, and the plates 11 limit the spring of the end teeth but the loops 16 in passing through the slots 14 and the ears 19 clamped between the hooked ends 18 of the end teeth and the axle 5 permit the end teeth to spring slightly. The shield attachment therefore prevents the hay from escaping and also modifies the movement of the end teeth, and therefore overcomes the objections above noted. Upon the teeth 10 being swung upward to accumulate the hay in windrows, the shield attachment serves to facilitate the clean discharge of the hay from the teeth.

The attachments are preferably constructed of suitable sheet metal and are inexpensive, as well as efficient and convenient in use.

What is claimed as new is:—

1. A shield attachment for sulky rakes comprising a plate having one edge curved to correspond to the curve of the rake teeth, a flange projecting from the said curved edge to receive one of the rake teeth, and means for securing the flange to the said tooth.

2. A shield attachment for sulky rakes comprising a plate having one edge curved to correspond to the curve of the rake teeth, a flange projecting from the curved edge to receive one of the rake teeth, the said flange having a slot near one end thereof for the passage of the loop of the tooth and means for securing the tooth at an intermediate portion to the flange.

3. A shield attachment for sulky rakes comprising a plate having one edge curved to correspond to the curve of the rake teeth, a flange projecting from the curved edge to receive one of the rake teeth, the said flange having a slot near one end thereof for the passage of the loop of the tooth and having an ear projecting from the corresponding end to be clamped between the axle and the end of the tooth and means for securing the tooth at an intermediate portion to the flange.

4. The combination with a sulky rake including a wheel mounted axle, and teeth bolted to the underside of the axle and having loops; of shield attachments comprising plates having one of their edges curved to correspond to the rake teeth and flanges projecting from the said curved edges to receive the end teeth, the said flanges having slots near their upper ends through which the loops of the end teeth project and having ears projecting from the upper ends thereof and clamped between the axle and the ends of the end teeth, the end teeth being secured to the flanges at an intermediate portion, and braces attached to the said flanges and to the said axle.

In testimony that I claim the foregoing as my own, I have hereto affixed my signature in the presence of two witnesses.

JAMES M. WILSON.

Witnesses:
JOHN S. RASH,
O. H. BURNETT.

---

Copies of this patent may be obtained for five cents each, by addressing the "Commissioner of Patents, Washington, D. C."